3,489,758
1-[(2,6-DIMETHYLPIPERIDINO)LOWER ALKYL]-3-
[(1-PHENYLCYCLOBUTYL)CARBONYL]UREAS
Donald E. Butler, Ann Arbor, Mich., assignor to Parke,
Davis & Company, Detroit, Mich., a corporation of
Michigan
No Drawing. Filed May 26, 1967, Ser. No. 641,495
Int. Cl. C07d 29/30; C07c 119/04; A61k 27/00
U.S. Cl. 260—294
5 Claims

ABSTRACT OF THE DISCLOSURE

1-[2,6 - dimethylpiperidino)alkyl] - 3 - [(1 - phenylcyclobutyl)carbonyl]urea compounds, in which the alkyl connecting group has 2, 3, 4, or 5 carbon atoms, and acid-addition salts thereof, useful as pharmacological agents that are of particular value as anti-arrhythmic agents capable of restoring normal cardiac rhythm; production of the free bases by reacting (1-phenylcyclobutyl)carbonyl/isocyanate with 2,6 - dimethylpiperidino - $(CH_2)_n$—$NH_2$, where $n$ is 2, 3, 4, or 5; and production of the acid-addition salts by reacting the free bases with an acid.

SUMMARY AND DETAILED DESCRIPTION

The present invention relates to new urea compounds that are useful as pharmacological agents and to methods for their production. More particularly, the invention relates to new [(1-phenylcyclobutyl)carbonyl]urea compounds having in the free base form the formula

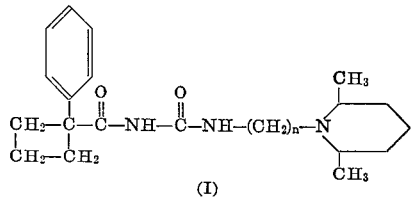

(I)

and to pharmaceutically-acceptable acid-addition salts thereof; where $n$ is a positive integer having a value of 2, 3, 4, or 5.

In accordance with the invention, compounds having the foregoing formula are produced by reacting (1-phenylcyclobutyl)carbonyl isocyanate, which has the formula

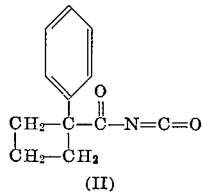

(II)

with a 2,6-dimethylpiperidinoalkylamine compound having the formula

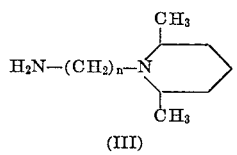

(III)

where $n$ has the aforementioned significance. Although a solvent is not strictly required, the reaction is conveniently and advantageously carried out in any of a number of unreactive solvents. Suitable solvents include aromatic hydrocarbons, such as benzene, toluene, and xylene; chlorinated hydrocarbons, such as chloroform, carbon tetrachloride, and ethylene dichloride; various ethers, such as diethyl ether, dioxane, and tetrahydrofuran; tertiary amides, such as N,N-dimethylformamide and N-methyl-2-pyrrolidone; and acetonitrile; as well as mixtures of these. A preferred solvent is benzene. The temperature and duration are not critical, since reaction is rapid even at room temperature or below. For convenience in insuring optimum results, the reaction is best carried out by heating the reaction mixture under reflux for a period that may vary from 15 minutes to one hour. While equivalent quantities of reactants may be employed, a slight excess of either is not harmful. To insure complete reaction it is preferable to use a slight excess of the amine reactant.

The (1-phenylcyclobutyl)carbonyl isocyanate starting material used above is prepared by reacting 1-phenylcyclobutanecarboxamide with oxalyl chloride. The 2,6-dimethylpiperidinoalkylamine starting materials are prepared by reacting 2,6-dimethylpiperidine with glycolonitrile or with a halogenated nitrile of the formula $$X—(CH_2)_m—CN$$

(IV)

and basifying the product to give a nitrile compound having the formula

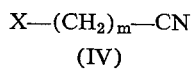

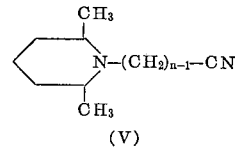

(V)

which is reduced by reaction with lithium aluminum hydride and subsequent hydrolysis to give the desired 2,6-dimethylpiperidinoalkylamine starting material; where $m$ is 3 or 4 and $n$ is as previously defined.

The free base compounds of the invention, having Formula I above, form acid-addition salts with any of a variety of inorganic and organic acids. Pharmaceutically-acceptable acid-addition salts are formed by reacting the free base in an unreactive solvent medium with an equivalent amount or with a slight to moderate excess of an acid such as hydrochloric, hydrobromic, sulfuric, phosphoric, acetic, succinic, citric, tartaric, malic, maleic, benzoic, salicylic, and pamoic acids. The acid-addition salts are converted to the free bases by reaction with a base such as sodium hydroxide, potassium carbonate, or potassium bicarbonate. The free bases and their acid-addition salts differ in solubility properties but in general are otherwise equivalent for purposes of the invention.

The compounds of the invention are new chemical compounds that are useful as pharmacological agents. They are of particular value as anti-arrhythmic agents that are capable of restoring normal cardiac rhythm. Their quantitative activity in this respect can be measured in a standard laboratory test. In this test ventricular tachycardia is produced in dogs by ligation of the anterior descending branch of the left coronary artery. A compound of the invention is then administered intravenously and the amount of reversion to normal cardiac rhythm is measured. Complete or almost complete reversion to normal rhythm is indicative of high activity.

The invention is illustrated by the following examples.

EXAMPLE 1

To a solution of 9 g. of 3-(2,6-dimethylpiperidino)propylamine in 200 ml. of benzene is added 10 g. of (1-phenylcyclobutyl)carbonyl isocyanate, and the resulting mixture is heated under reflux for 30 minutes and then evaporated to dryness under reduced pressure to give a solid residue of 1-[3-(2,6-dimethylpiperidino)propyl]-3-[(1-phenylcyclobutyl)carbonyl]urea; M.P. 102–104° C., following crystallization from benzene-petroleum ether.

A solution of 2 g. of 1-[3-(2,6-dimethylpiperidino)-propyl]-3-[(1-phenylcyclobutyl)carbonyl]urea in 25 ml.

of isopropyl alcohol is treated with a slight excess of hydrogen chloride dissolved in 25 ml. of the same solvent. The resulting solution is diluted with anhydrous diethyl ether until a precipitate begins to form, and the mixture is then kept at room temperature for several hours or until crystallization is complete. The solid precipitate of 1-[3-(2, 6-dimethylpiperidino)propyl]-3-[(1-phenylcyclobutyl)carbonyl]urea hydrochloride is isolated by filtration and dried under reduced pressure at 60° C.; M.P. 153–155° C. (with decomposition).

The (1-phenylcyclobutyl)carbonyl isocyanate starting material is prepared as follows. To a solution of 192 g. of 1-phenylcyclobutanecarboxamide in 1000 ml. of ethylene dichloride is added 200 g. of oxalyl chloride, and, after the initial gas evolution has subsided, the resulting mixture is heated under reflux for 16 hours. The solvent is removed by evaporation, and the residue is distilled under reduced pressure to give (1-phenylcyclobutyl)carbonyl isocyanate; B.P. 70–72° C./0.4 mm. Hg.

EXAMPLE 2

To a solution of 10 g. of 2-(2,6-dimethylpiperidino)-ethylamine in 200 ml. of benzene is added 10 g. of (1-phenylcyclobutyl)carbonyl isocyanate, and the resulting mixture is heated under reflux for 45 minutes and then evaporated under reduced pressure to give a solid residue of 1-[2-(2,6-dimethylpiperidino)ethyl]-3-[(1-phenylcyclobutyl)carbonyl]urea; M.P. 91–93° C., following crystallization from n-heptane.

EXAMPLE 3

To a solution of 10 g. of 4-(2,6-dimethylpiperidino)-butylamine in 200 ml. of benzene is added 10 g. of (1-phenylcyclobutyl)carbonyl isocyanate, and the resulting mixture is heated under reflux for 30 minutes and then evaporated under reduced pressure. The residue is treated with 25 ml. of n-heptane, the mixture is again evaporated to dryness, and the residue of 1-[4-(2,6-dimethylpiperidino)butyl]-3-[(1-phenylcyclobutyl)carbonyl]urea, which crystallizes on standing, is triturated with petroleum ether and collected by filtration; M.P. 88–90° C.

The hydrobromide salt is obtained by treating a solution of the free base in isopropyl alcohol with a slight excess of gaseous hydrogen bromide, diluting the resulting solution with ether until a precipitate begins to form, and then, after precipitation is complete, isolating and drying the solid salt obtained.

The citrate salt is obtained by treating a solution of the free base in a minimum amount of isopropyl alcohol with a solution of an equivalent amount of citric acid in the same solvent, cooling the resulting mixture, and, after crystallization is complete, isolating and drying the solid salt obtained. The d-tartrate salt of 1-[4-(2,6-dimethylpiperidino)butyl]-3-[(1 - phenylcyclobutyl)carbonyl]urea is obtained in a similar manner by reacting the free base with an equivalent amount of d-tartaric acid in isopropyl alcohol solution.

EXAMPLE 4

To a solution of 15 g. of 5-(2,6-dimethylpiperidino) pentylamine in 200 ml. of benzene is added 10 g. of (1-phenylcyclobutyl)carbonyl isocyanate, and the resulting mixture is heated under reflux for 45 minutes and then distilled under reduced pressure (0.2 mm. Hg) until the temperature of the mixture reaches 120° C. The residue is cooled to room temperature, diluted with an equal volume of petroleum ether, and the 1-[5-(2,6-dimethylpiperidino)pentyl] - 3 - [(1-phenylcyclobutyl)carbonyl] urea that is obtained is isolated, dried, and crystallized from ether; M.P. 108–110° C.

The 2,6-dimethylpiperidinoalkylamine compounds required as starting materials in the foregoing examples are prepared as follows.

A solution of 148 g. of 4-bromobutyronitrile and 226 g. of 2,6-dimethylpiperidine in 400 ml. of toluene is heated under reflux for 5 hours. The reaction mixture is cooled and made slightly acidic with dilute hydrochloric acid. The aqueous layer is separated, made basic with aqueous sodium hydroxide, and extracted with ether. The ether extract is dried and evaporated to give a residue of 4-(2,6-dimethylpiperidino)butyronitrile; B.P. 140–150° C./14 mm. Hg. By utilizing the same general procedure, there is obtained 5-(2,6-dimethylpiperidino)valeronitrile; B.P. 164–166° C./20 mm. Hg.

With external cooling, 226 g. of 2,6-dimethylpiperidine is added dropwise to 187 ml. of 70% aqueous glycolonitrile. The mixture is heated to 70° C., then cooled, diluted with ether, and washed with water. The ether phase is separated, dried, filtered, and evaporated to give a residue of 2-(2,6 - dimethylpiperidino)acetonitrile; B.P. 103–105° C./14 mm. Hg.

With stirring, 121 g. of 4-(2,6-dimethylpiperidino) butyronitrile is added dropwise to 25.5 g. of lithium aluminum hydride in 2000 ml. of ether. The reaction mixture is then heated under reflux for 2 hours and diluted with 27 ml. of water, 20 ml. of 20% aqueous sodium hydroxide, and 90 ml. of water, added in that order. The insoluble material is removed by filtration and the filtrate is evaporated under reduced pressure to give a residue of 4-(2,6-dimethylpiperidino)butylamine; B.P. 130–134° C./16 mm. Hg. In a similar manner, the following additional diamines are obtained: 5-(2,6-dimethylpiperidino) pentylamine; B.P. 86–88° C./0.25 mm. Hg. 2-(2,6-dimethylpiperidino)ethylamine; B.P. 99–105° C./14 mm. Hg.

What is claimed is:

1. A member of the class consisting of [(1-phenylcyclobutyl)carbonyl]urea compounds, having in the free base form the formula

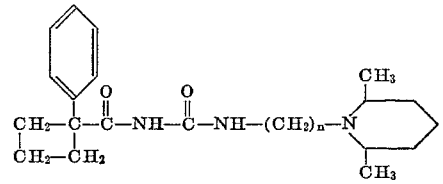

and pharmaceutically-acceptable acid-addition salts thereof; where $n$ is a positive integer having a value selected from among 2, 3, 4, and 5.

2. A compound according to claim 1 wherein $n$ is 2.
3. A compound according to claim 1 wherein $n$ is 3.
4. A compound according to claim 1 wherein $n$ is 4.
5. A compound according to claim 1 wherein $n$ is 5.

References Cited

UNITED STATES PATENTS 3,261,865   7/1966   Speziale et al. _____ 260—553

OTHER REFERENCES

Morrison et al., Organic Chemistry, 2nd ed., Allyn and Bacon, Inc., Boston, Mass. (1966), p. 927.

Spielman et al., J. Am. Pharm. Assoc. 35, 28–31 (1946).

HENRY R. JILES, Primary Examiner

G. THOMAS TODD, Assistant Examiner

U.S. Cl. X.R.

260—453, 999